United States Patent
Dietrich (10) Patent No.: US 12,241,397 B2
(45) Date of Patent: Mar. 4, 2025

(54) EXHAUST AFTER TREATMENT COOLING SYSTEM

(71) Applicant: AGCO International GmbH, Neuhausen (CH)

(72) Inventor: Ulrich Dietrich, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 14 days.

(21) Appl. No.: 17/755,502

(22) PCT Filed: Oct. 26, 2020

(86) PCT No.: PCT/IB2020/060022
§ 371 (c)(1),
(2) Date: Apr. 29, 2022

(87) PCT Pub. No.: WO2021/084399
PCT Pub. Date: May 6, 2021

(65) Prior Publication Data
US 2022/0372903 A1 Nov. 24, 2022

(30) Foreign Application Priority Data
Oct. 31, 2019 (GB) ..................... 1915858

(51) Int. Cl.
*F01N 3/20* (2006.01)
(52) U.S. Cl.
CPC ........ *F01N 3/208* (2013.01); *F01N 2260/024* (2013.01); *F01N 2610/02* (2013.01); *F01N 2610/11* (2013.01)
(58) Field of Classification Search
CPC ........... F01N 2260/024; F01N 2610/11; F01N 3/208; F01N 2610/02
(Continued)

(56) References Cited

U.S. PATENT DOCUMENTS

| 5,321,215 A | * | 6/1994 | Kicinski | F01N 13/085 181/227 |
| 5,364,599 A | * | 11/1994 | Lee | F01N 3/10 422/171 |

(Continued)

FOREIGN PATENT DOCUMENTS

| EP | 2884070 A1 | 6/2015 |
| EP | 3489478 A1 | 5/2019 |

(Continued)

OTHER PUBLICATIONS

UK Intellectual Property Office, Search report for related UK Application No. GB1915858.3, dated Mar. 25, 2020.
(Continued)

*Primary Examiner* — Logan M Kraft
*Assistant Examiner* — Joshua Campbell (57) ABSTRACT

There is described a cooling system for a tractor exhaust after treatment. The cooling system comprises a urea supply module have a first port and a second port, and an exhaust system, wherein the exhaust system comprises an exhaust pipe and a catalytic converter. An engine cooling system comprises a heat exchanger, a fan, a coolant pump, a coolant feed line, and a coolant return line. The coolant feed line comprises a first portion and a section portion, and the coolant return line comprises a primary portion and a secondary portion. Each of the first portion, the second portion, the primary portion and the secondary portion are oriented generally vertically. The second portion is in fluid communication with the first port, and the secondary portion is in fluid communication with the second port. A bypass line provides fluid communication between the second and secondary portions.

8 Claims, 10 Drawing Sheets

(58) Field of Classification Search
USPC .......................................... 123/41.31; 60/286
See application file for complete search history.

(56) References Cited

U.S. PATENT DOCUMENTS

| | | | | | |
|---|---|---|---|---|---|
| 5,431,893 | A | * | 7/1995 | Hug | .................... F01N 13/0097 |
| | | | | | 423/239.1 |
| 5,808,245 | A | * | 9/1998 | Wiese | ..................... F01N 3/005 |
| | | | | | 60/299 |
| 6,301,879 | B1 | * | 10/2001 | Weisweiler | ........... F01N 3/2066 |
| | | | | | 60/303 |
| 6,399,034 | B1 | * | 6/2002 | Weisweiler | ........... F01N 3/2066 |
| | | | | | 423/239.1 |
| 6,539,708 | B1 | * | 4/2003 | Hofmann | ........... B01D 53/9495 |
| | | | | | 239/132.3 |
| 6,739,126 | B2 | * | 5/2004 | Huthwohl | ............. F01N 3/2066 |
| | | | | | 123/514 |
| 2004/0200214 | A1 | * | 10/2004 | Nomura | .............. C23C 16/4412 |
| | | | | | 60/297 |
| 2004/0206069 | A1 | | 10/2004 | Tumati et al. | |
| 2007/0079599 | A1 | * | 4/2007 | Osaku | .................. F01N 3/2066 |
| | | | | | 60/301 |
| 2007/0266698 | A1 | * | 11/2007 | Buerglin | ................... F01N 3/36 |
| | | | | | 60/282 |
| 2010/0162690 | A1 | * | 7/2010 | Hosaka | ................. F01N 3/2066 |
| | | | | | 220/592.01 |
| 2012/0017575 | A1 | * | 1/2012 | Sloss | ....................... F28F 27/02 |
| | | | | | 60/320 |
| 2013/0081377 | A1 | * | 4/2013 | Burger | ..................... F01N 3/36 |
| | | | | | 60/273 |
| 2015/0211401 | A1 | | 7/2015 | Kamada | |
| 2015/0246369 | A1 | * | 9/2015 | Sykes | .................. H01F 7/1811 |
| | | | | | 239/128 |
| 2016/0208670 | A1 | | 7/2016 | Dylhoff et al. | |
| 2016/0303511 | A1 | * | 10/2016 | Nagano | .............. B01D 53/9431 |
| 2019/0383197 | A1 | * | 12/2019 | Jang | .................... F01N 13/1805 |
| 2020/0182117 | A1 | | 6/2020 | Morimitsu et al. | |

FOREIGN PATENT DOCUMENTS

| | | | | |
|---|---|---|---|---|
| JP | 2003020939 A | * | 1/2003 | ............. F01N 3/037 |
| JP | 2007321647 A | * | 12/2007 | ........... F01N 13/009 |
| JP | 2011080397 A | | 4/2011 | |
| JP | 2012007511 A | * | 1/2012 | |
| JP | 2014181718 A | | 9/2014 | |
| JP | 2017025743 A | | 2/2017 | |
| WO | 2010/069806 A1 | | 12/2009 | |
| WO | 2014102122 A1 | | 7/2014 | |

OTHER PUBLICATIONS

European Patent Office, International Search Report related to International Patent Application No. PCT/IB2020/060022 , mail date Dec. 3, 2020.

* cited by examiner

EXHAUST AFTER TREATMENT COOLING SYSTEM

CROSS-REFERENCE TO RELATED APPLICATIONS

This application is a national phase entry under 35 U.S.C. § 371 of International Patent Application PCT/IB2020/060022, filed Oct. 26, 2020, designating the United States of America and published in English as International Patent Publication WO 2021/084399 A1 on May 6, 2021, which claims the benefit of and priority from United Kingdom Application No. 1915858.3, filed Oct. 31, 2019; and United Kingdom Application No. 1916258.5, filed Nov. 8, 2019, the entire disclosure of each of which is hereby incorporated by reference.

TECHNICAL FIELD

The present disclosure relates to cooling system for components of an exhaust gas treatment system from an internal combustion engine of a vehicle, particularly, but not exclusively so, a tractor.

BACKGROUND

It is well known to provide a vehicle exhaust gas treatment system in which a urea solution is injected into a catalytic converter located in the exhaust system of an internal combustion engine, to significantly reduce the level of exhaust pollutants such as carbon monoxide, nitrogen oxide and particulate matter in the exhaust gases.

Problems arise with such treatment systems because if the temperature of the urea exceeds 60° C., due to exposure to the sun or the close proximity of hot components on the vehicle, the urea starts to break down into corrosive constituents that can damage the components of the treatment system. Therefore, the urea itself and/or components (delivering the urea), such as urea dosing module, are often provided with cooling means.

Cooling is typically carried out by directing engine coolant, e.g., a water glycol mixture, via the dosing module, the coolant being circulated by the engine coolant pump. The cooling of the dosing module is especially important as this component is in contact with the hot exhaust gas and faces high heat impact.

A problem arises immediately after when the engine is shut down, especially when operating in a hot environment and/or after a long duration of operation. The engine water pump, driven by the engine, ceases to propel engine coolant through the dosing module.

International Patent Application Publication WO2014/102122 A1, "Auxiliary Cooling Means for a Dosing Module in an Exhaust Treatment System," published Jul. 3, 2014; and U.S. Patent Application Publication US2016/0208670 A1, "DEF Injector Cooling System and Method," published Jul. 21, 2016, both suggest to provide an additional electrically driven auxiliary fluid pump to force the cooling fluid around the fluid circuit to the dosing module, wherein the auxiliary pump is activated automatically when the engine is shut down. This solution requires additional components, connecting lines and a dedicated control system, which increases costs and installation space.

An improved form of cooling system for the urea solution and especially components in the above exhaust treatment systems would be beneficial.

BRIEF SUMMARY

Accordingly, there is provided a cooling system for a tractor exhaust after treatment, the cooling system comprising: a urea supply module having first port and a second port; an exhaust system, wherein the exhaust system comprises an exhaust pipe and a catalytic converter, the catalytic converter being orientated relative to an axis C, axis C being substantially vertical to ground; an engine cooling system, wherein the engine cooling system comprises a heat exchanger, a fan, a coolant pump, a coolant feed line, a coolant return line, wherein the coolant feed line comprises a first portion and a second portion, and the coolant return line comprises a primary portion and a secondary portion and wherein each of the first portion, the second portion, the primary portion and the secondary portion are oriented longitudinally parallel to the axis C, and, wherein the second portion is in fluid communication with the first port, and the secondary portion is in fluid communication with the second port, and a bypass line, the bypass line being in fluid communication with each of the second portion and the secondary portion.

Advantageously, evaporation bubbles can be effectively routed and coolant supplied such that the urea supply module is effectively cooled. Further advantageously, the bypass line allows pressures to be balanced between the feed and return lines of the cooling system.

References to "substantially vertical" herein will be understood to include exactly vertical, and to be in the range including 85° to 90° angle to the horizontal.

Preferably, each of the second portion and secondary portion may have a cross-sectional area greater than the cross sectional area of the first portion and the primary portion.

Advantageously, the increased cross sectional area allows for an increased volume of coolant to be held.

Preferably, with the axis C in a substantially vertical orientation, the first port and the second port may be at the same level relative to the ground. Alternatively, with the axis C in a substantially vertical orientation, one of the first port and the second port may be positioned at a higher level relative to the ground than the other of the first port and the second port.

Advantageously, positioning the ports at appropriate relative heights allows evaporation bubbles to collect in predetermined positions at various inclinations of the cooling system and exhaust package.

Preferably, the second portion and secondary portion may function as coolant reservoirs.

Advantageously, this allows for a greater amount of coolant and thus thermal mass to be provided and thereby increases the cooling capacity of the system.

The exhaust system may be parallel to the axis C. The catalytic converter may be inclined relative to the axis C, or be perpendicular to it.

A tractor may include the cooling system.

Advantageously, the effective cooling of the urea supply module allows a tractor to operate more cleanly and reduce emissions.

BRIEF DESCRIPTION OF THE DRAWINGS

Embodiments will now be described, by way of example only, with reference to the accompanying drawings, in which.

DETAILED DESCRIPTION

The drawings are provided by way of reference only, and will be acknowledged as not to scale.

Figure 1:
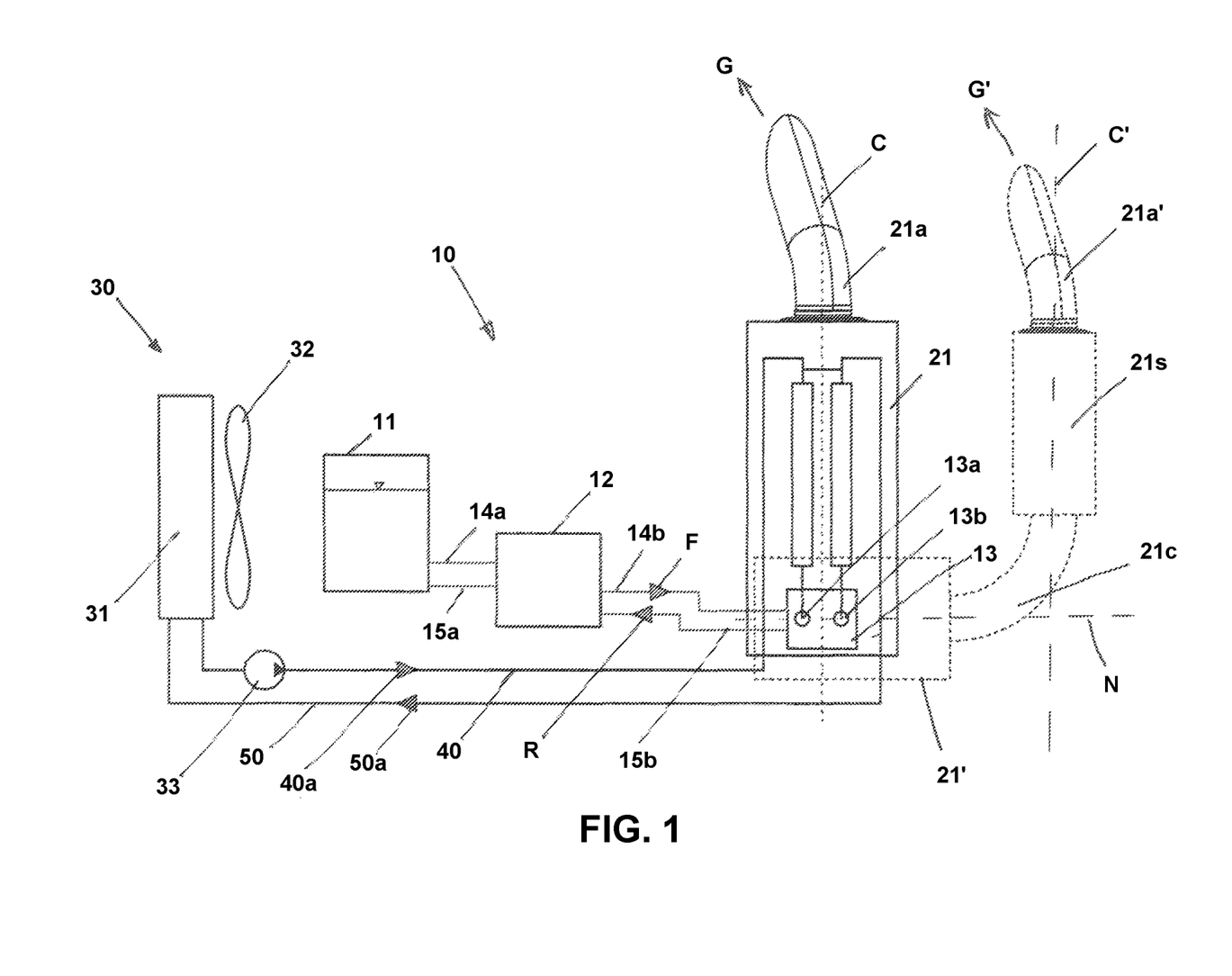
FIG. 1 is a diagram of a vehicle exhaust gas treatment system.

With reference to FIG. 1, an engine exhaust gas treatment system 10 is shown. The engine exhaust gas treatment system 10 has a urea solution supply tank 11 which supplies urea to a urea supply module 12. The urea supply module 12 next supplies a urea dosing module 13 via the urea feed lines 14a, 14b and urea return lines 15a, 15b (indicated by arrows F—feed and R—return respectively). An alternative construction of the exhaust gas treatment system 10 including an exhaust silencer 21s is shown in dotted lines and can be better seen in FIG. 10.

In some embodiments and configurations, the urea return line 15b may not be required.

Dosing module 13 injects the urea into a Selective Catalytic Reduction (SCR) catalytic converter 21 which is longitudinally aligned along an axis C, which is substantially vertical, in the general direction of the exhaust gas stream indicated by arrow G out of an exhaust pipe 21a. The SCR and exhaust pipe 21a are aligned to have the gas flow passing therethrough substantially aligned with the axis C, the axis C being substantially perpendicular to the ground.

The vehicle has an engine cooling system 30 comprising a heat exchanger 31, a fan 32, and an engine coolant pump 33 to supply cooling fluid, further referred to as coolant, to various components of the tractor.

The engine cooling system 30 may comprise further components such as sensors, valves, etc., to control the engine cooling system 30.

The coolant is provided to the urea dosing module 13 via a coolant feed line branch 40 (in a direction indicated by arrow 40a) which is connected to a coolant feed port 13a of the urea dosing module 13.

The coolant is returned to the heat exchanger 31 via a coolant return line branch 50 (in a direction indicated by arrow 50a) which is connected to a coolant return port 13b of the urea dosing module 13.

In normal operation, the engine coolant pump 33 is constantly circulating the coolant through coolant line branches 40, 50 so that the urea dosing module 13 is protected from overheating.

Upon shut down of the engine, the circulation of coolant stops and remaining coolant in the urea dosing module 13 may start to heat up excessively and may be consequently damaged.

Figure 2:
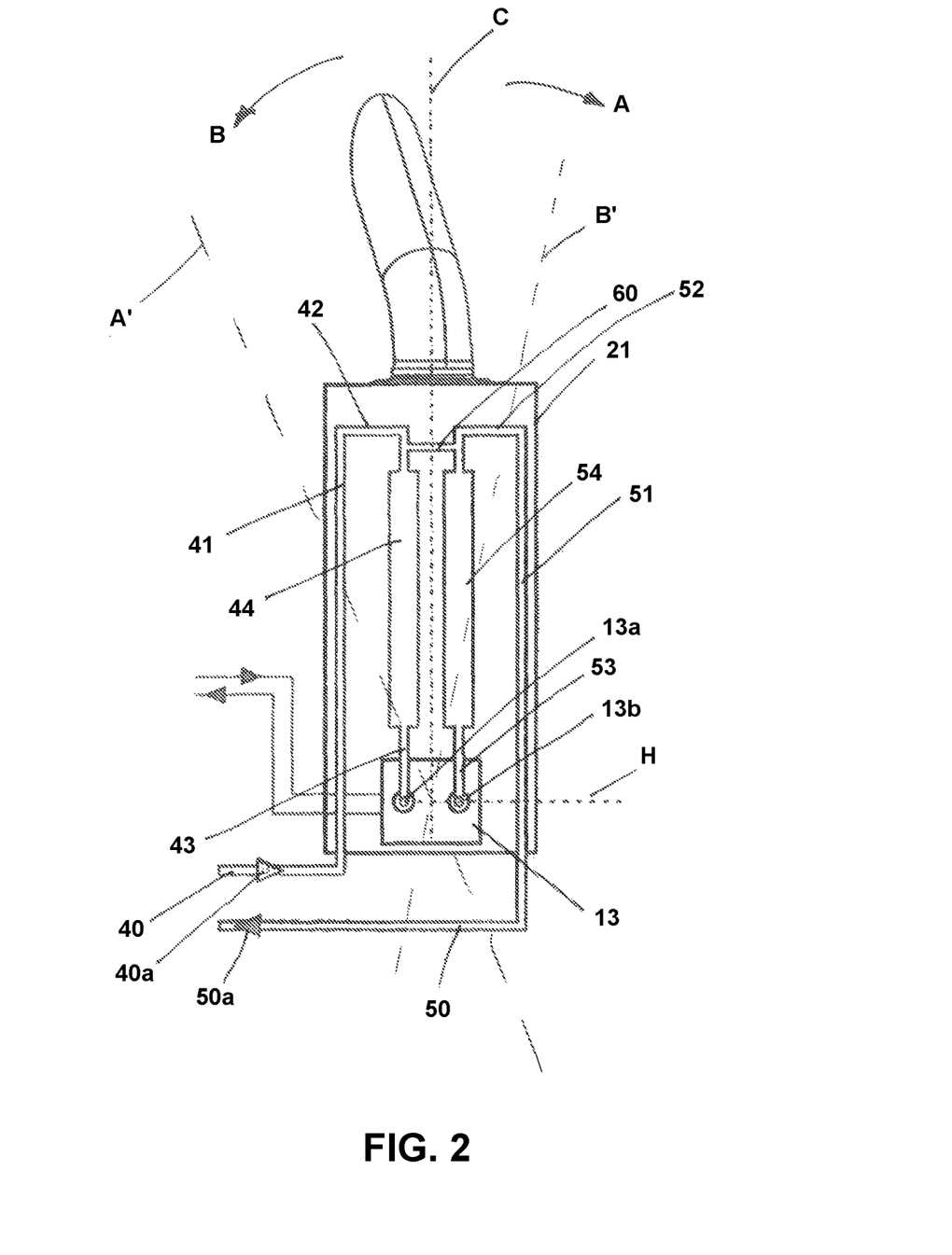
FIG. 2 is a schematic of a first embodiment of part of the cooling system of a vehicle exhaust gas treatment system of FIG. 1.

With reference to FIG. 2, the coolant feed line branch 40, seen in coolant flow direction indicated with arrow 40a, is provided with a first feed pipe section 41 extending vertically upwards above the horizontal level H of the ports 13a and 13b of the dosing module 13.

A second feed pipe section 42, is U-shaped or siphon-shaped with the ends directed downwards, i.e., towards the ports 13a and 13b of the dosing module 13.

One end of the second feed pipe section 42 is connected to and follows on from the first feed pipe section 41 and the second end and is connected to a vertical third feed pipe section 43 which ends at port 13a.

The coolant return line branch 50 contains coolant that flows in the opposite direction to that of the coolant in the coolant feed line branch 40, and flows in a direction indicated by arrow 50a. The coolant return line branch 50 has a first return pipe section 51 extending vertically upwards above the horizontal level H of the ports 13a and 13b of the dosing module 13.

A second return pipe section 52, is U-shaped or siphon-shaped with the ends directed downwards, i.e. towards the ports 13a and 13b of the dosing module 13.

One end of the second return pipe section 52 is connected to and follows on from the first return pipe section 51 and the second end and is connected to a vertical third return pipe section 53 which ends at port 13b.

During normal operation, coolant coming from engine coolant pump 33 passes first feed pipe section 41 upwards and is directed downwards by U-shaped second feed pipe section 42 into a vertical third feed pipe section 43 to enter the dosing module 13 via at port 13a.

The coolant then exits the dosing module 13 via port 13b and flows upwards in third return pipe section 53 to be directed downwards by U-shaped second return pipe section 52 and then passes through first return pipe section 51.

Upon shut down of the engine, with the engine coolant pump 33 not operating, the coolant in third feed pipe section 43 and third return pipe section 53 is trapped due to siphon action in the design.

Remaining coolant in the dosing module 13 is further heated up and starts to evaporate.

The evaporation of the coolant in the pipes causes evaporation bubbles to ascend in either the third feed pipe section 43 or the third return pipe section 53, depending on the inclination of the vehicle.

If the vehicle stands inclined in a direction indicated with Arrow A such that axis A' is substantially vertical, port 13a of the dosing module 13 is at a higher level compared to port 13b.

Because of this, evaporation bubbles will ascend into third feed pipe section 43 and displace the remaining coolant into first feed pipe section 51, whereas in the third return pipe section 53, no evaporation bubbles occur.

If the vehicle stands inclined in the opposite direction indicated with Arrow B such that axis B' is substantially vertical, port 13b of dosing module 13 is at a higher level compared to port 13a.

Because of this, evaporation bubbles will ascend into the third return pipe section 53 and displace the remaining coolant into the first return pipe section 51, whereas in the third feed pipe section 43, no evaporation bubbles occur.

In an example embodiment, the third feed pipe section 43 and/or the third return pipe section 53 extends in a substantially vertical direction from the ports 13a, 13b and forms a reservoir in which coolant is trapped after engine shut down.

Because evaporation bubbles reduce the density of the fluid in the respective pipe sections, the trapped fluid in the other section flows into the dosing module 13 to provide extra coolant for keeping the acceptable temperature level.

Because only a small inclination of the vehicle is enough to cause the evaporation through one of ports 13a and 13b, only one of the third feed pipe section 43 or the third return pipe section 53 may face evaporation bubbles while the other third feed pipe section 43 or third return pipe section 53 can provide extra coolant.

Even if both ports 13a and 13b are at an exact horizontal level, the evaporation bubbles will ascend in only one of third feed pipe section 43 or third return pipe section 53.

In some installations, it is enough to provide the third feed pipe section 43 or third return pipe section 53 with the same inner diameter as the other sections of the feed line branch 40 or return line branch 50 to form a reservoir sufficient to provide extra coolant.

Figure 9:
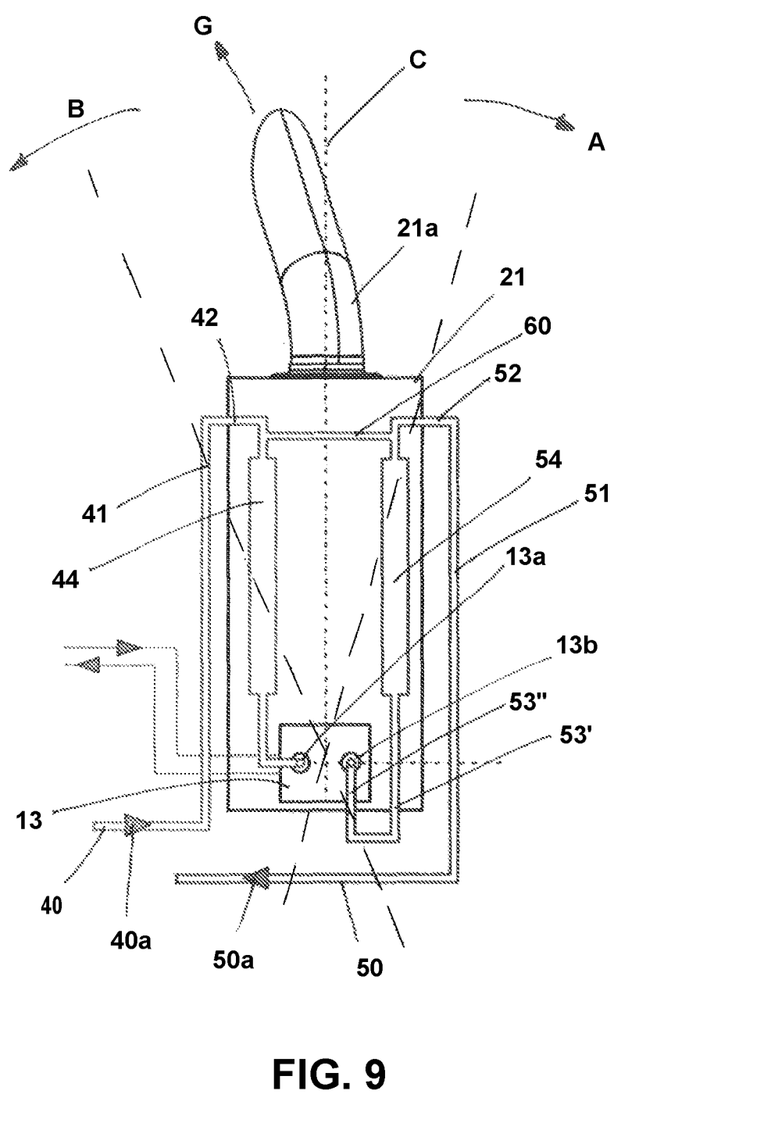
FIG. 9 is a schematic of a third embodiment of part of the cooling system of a vehicle exhaust gas treatment system of FIG. 1.
Figure 10:
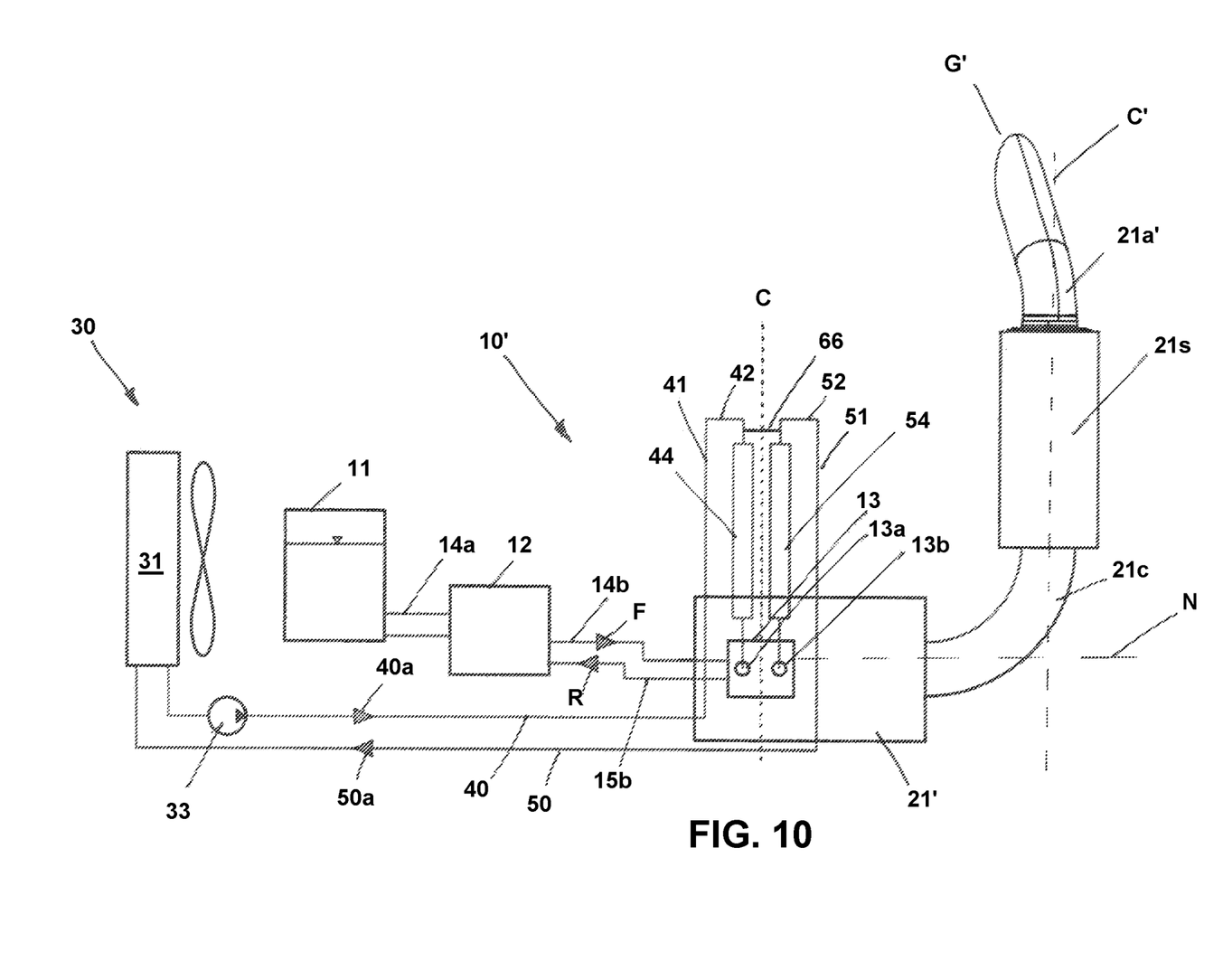
FIG. 10 is a diagram of a further embodiment of vehicle exhaust gas treatment system.

In further embodiments, the third feed pipe section 43 or third return pipe section 53 may have a diameter expansion 44, 54 (e.g., in the form of a rubber hose inserted on a pipe on both ends, see FIGS. 2, 9, and 10). Thereby the volume of coolant trapped can be increased or expanded as required.

Figure 3:
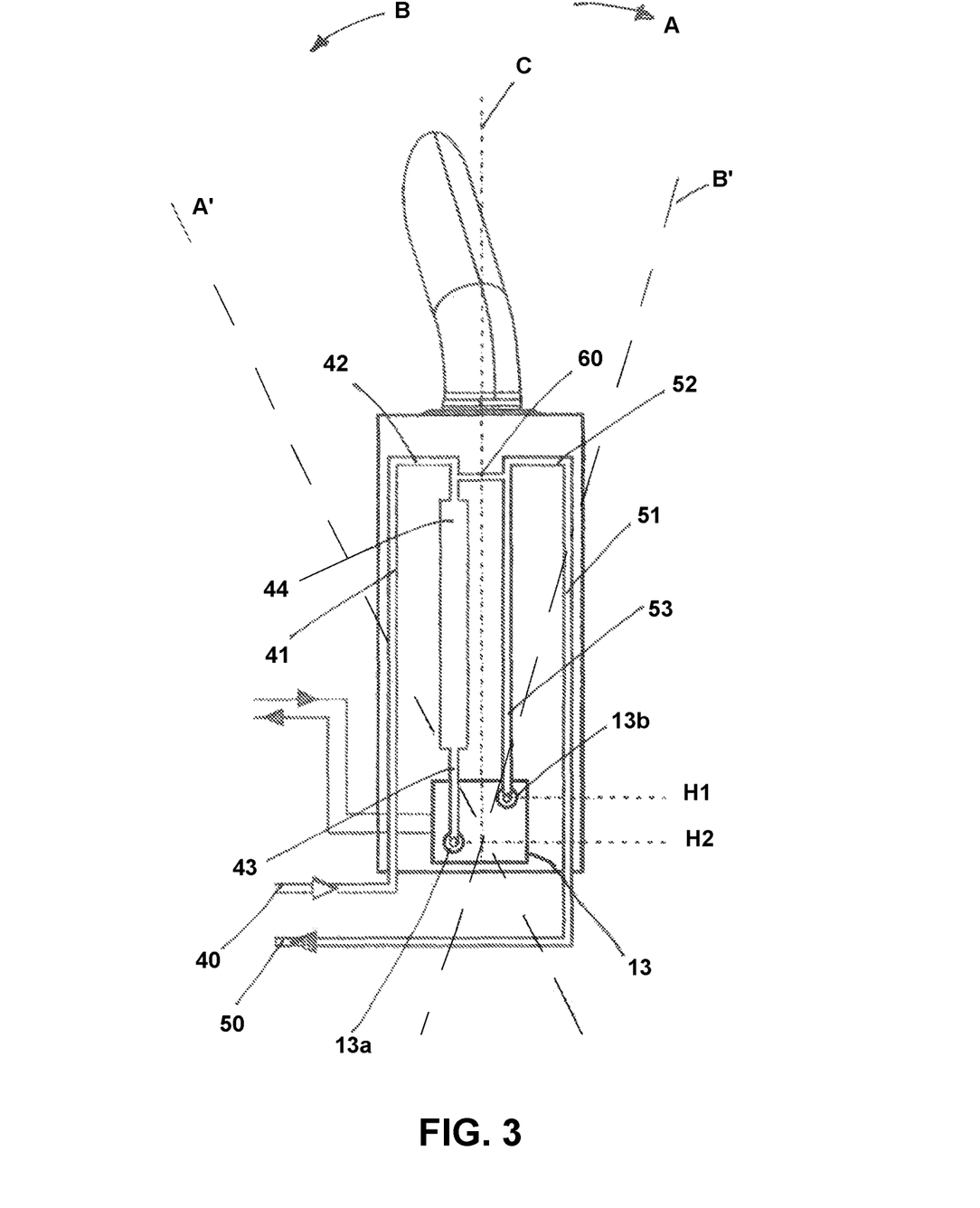
FIG. 3 is a schematic of a second embodiment of part of the cooling system of a vehicle exhaust gas treatment system of FIG. 1.

With reference to FIG. 3, an example is shown wherein the dosing module 13 is provided with ports 13a and 13b not aligned horizontally. As port 13b is on a higher level H1 while port 13a is on a lower level H2, the port 13b would always be above port 13a at every possible/allowable inclination of the vehicle.

This ensures that evaporation always takes place through port 13b. As a consequence, only the third feed pipe section 43 and expansion 44 is necessary to provide extra coolant for the case of engine shut-off.

In some embodiments, a bypass line 60 is provided between the third feed pipe section 43 and the third return pipe section 53.

In some circumstance, the evaporation of coolant may result in an excessive high pressure trapped in pipe section 43, 53. This high pressure would prevent coolant from the other pipe section to flow into the dosing module. The bypass line 60 serves to balance the pressure in pipe section 43 and 53 so that coolant can freely flow.

Figure 4:
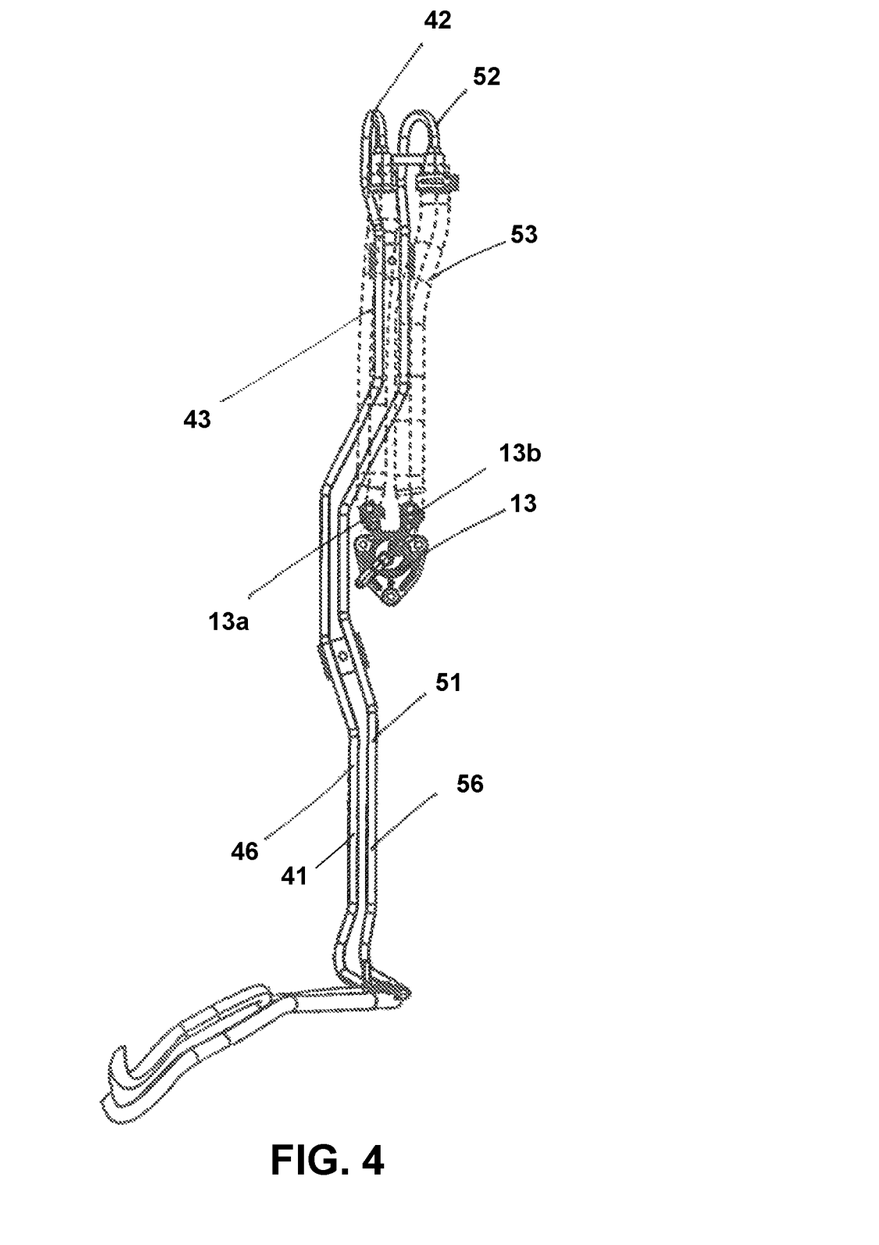
FIGS. 4 and 5 are perspective views of a part of the cooling system of a vehicle exhaust gas treatment system.
Figure 5:
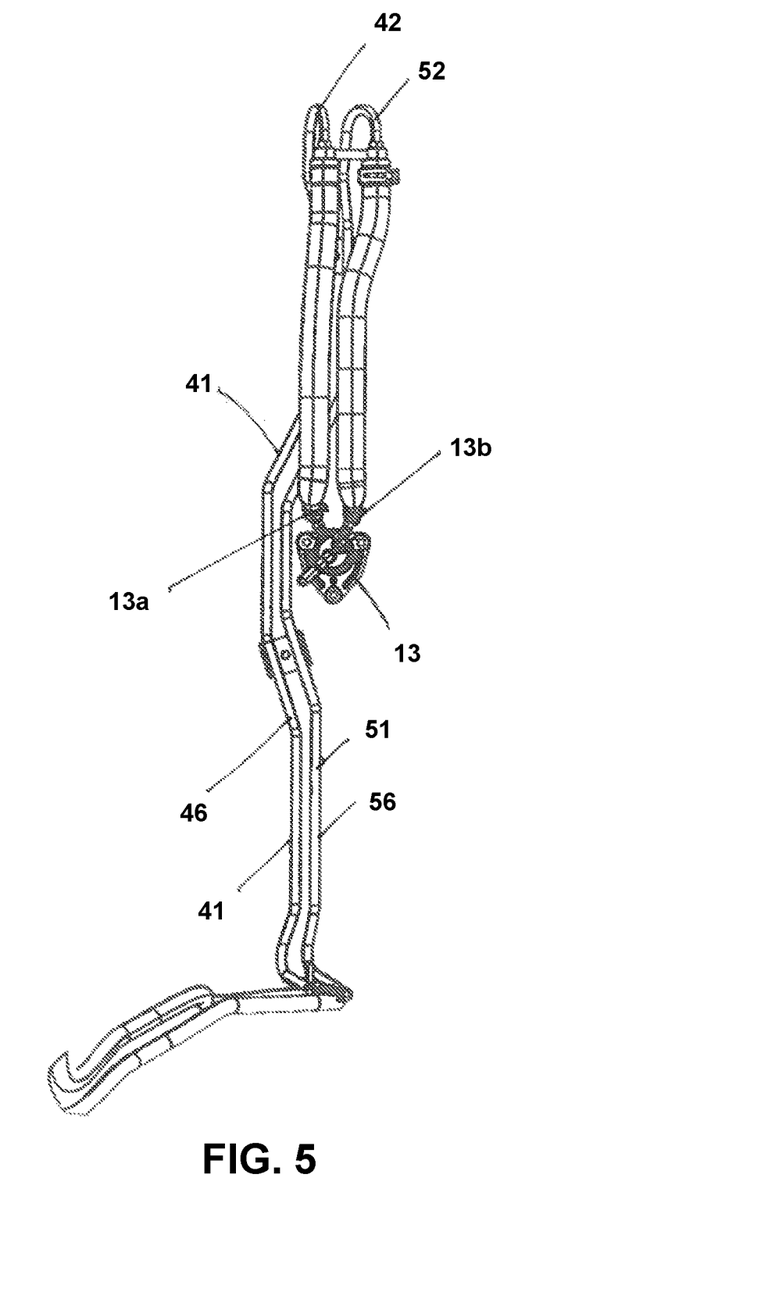

FIGS. 4 and 5 show the components of the cooling system installed on a tractor (not shown).

The first feed pipe section 41 and second feed pipe section 42 are integrated in one steel pipe 46. Similarly, first return pipe section 51 and second return pipe section 52 are integrated in one steel pipe 56.

The third feed pipe section 43 and the third return pipe section 53 are constructed from rubber hoses having a relative large diameter compared to the other pipe section to which they are attached and thus form diameter expansion 44, 54.

In FIG. 4, the third feed pipe section 43 and third return pipe section 53 are shown in dotted lines to show the compact installation by placing the lines in close vicinity and one behind the other to reduce necessary installation space.

Figure 6:
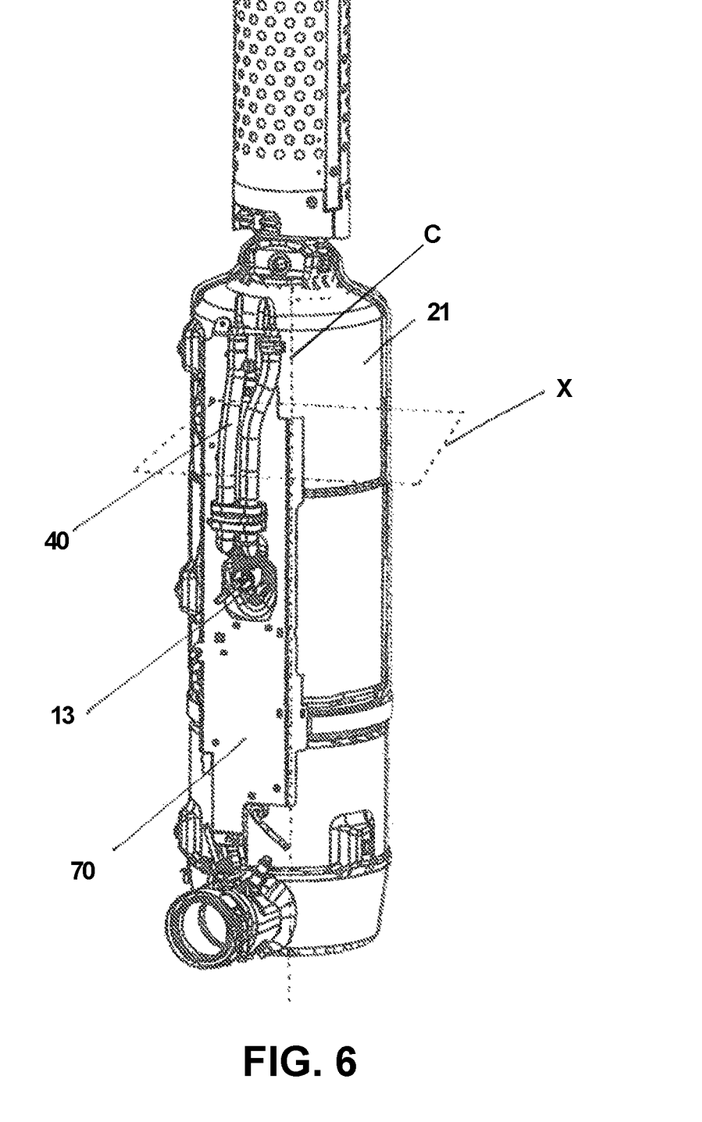
FIG. 6 is a perspective view of a part of the cooling system and the vehicle exhaust gas treatment system.

FIG. 6 shows a Selective Catalytic Reduction (SCR) catalytic converter 21 and dosing module 13 both installed in a vertical direction along axis C and suitable for installation at the right A-pillar of a cab of a tractor (not shown) similar to the installation described in International Patent Application Publication WO 2010/069806 A1, "Exhaust Systems for Vehicles," published Dec. 7, 2009. The components of the feed line branch 40 and coolant return line branch 50 are supported by a sheet metal support 70 suitable for attachment to the A-pillar of an associated tractor.

Figure 7:
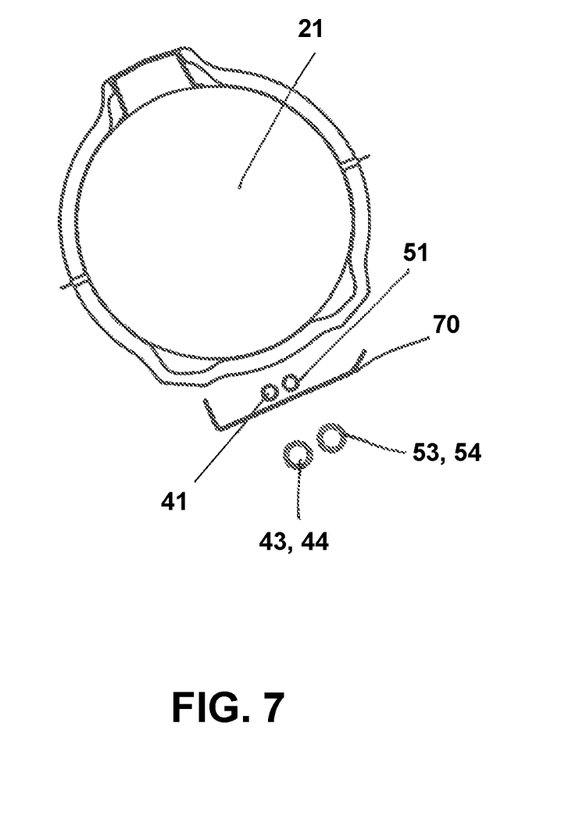
FIG. 7 is a sectional view of FIG. 6 of the cooling system and the vehicle exhaust gas treatment system.

As shown with FIG. 7, representing a sectional view of FIG. 6 at a plane X perpendicular to axis C, the sheet metal support 70 is situated in-between the Selective Catalytic Reduction (SCR) catalytic converter 21 and the third feed pipe section 43 along with diameter expansion 44, and third return pipe section 53, along with diameter expansion 54, and thereby provides a thermal or heat shield.

Because of this arrangement, the coolant trapped in the third feed pipe section 43, along with diameter expansion 44, and the third return pipe section 53, along with diameter expansion 54 is kept at a relatively lower temperature, than if there were no heat shield, to provide more cooling capacity for the dosing module 13.

Additionally, this enables the third feed pipe section 43, along with diameter expansion 44, and the third return pipe section 53, along with diameter expansion 54, to be made of rubber (hoses) or other material with low thermal resistance, because they are protected by the thermal shielding.

The first feed pipe section 41 and first return pipe section 51 are positioned in between sheet metal support 70 and catalytic converter 21 because the heat impact is of minor relevance when steel pipes are used.

Figure 8:
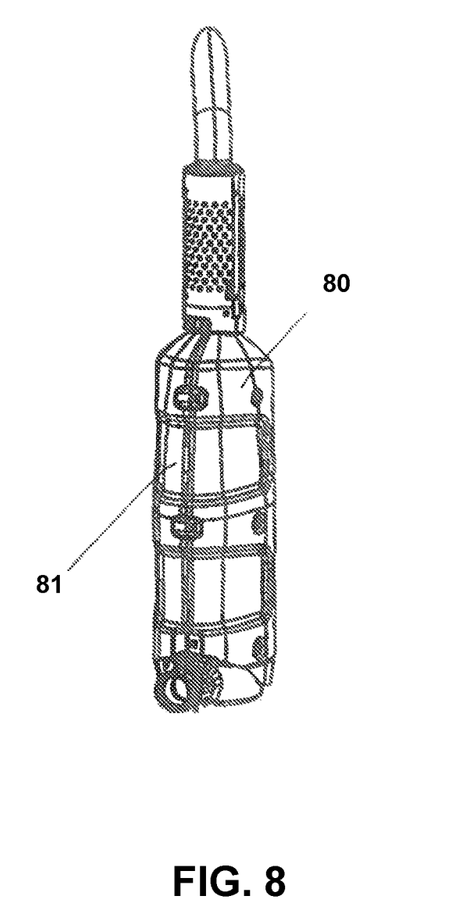
FIG. 8 is a perspective view of a part of the cooling system and the vehicle exhaust gas treatment system equivalent to FIG. 6 with interior components hidden by covers.

With reference to FIG. 8, the Selective Catalytic Reduction (SCR) catalytic converter 21, the dosing module 13, and major parts of the components are hidden by covers 80, 81 to prohibit an operator from contacting the hot parts.

In an alternative embodiment as best seen in FIG. 10, an exhaust gas treatment 10' is shown.

Dosing module 13 injects the urea into a Selective Catalytic Reduction (SCR) catalytic converter 21' aligned perpendicular to the axis C' and axis C, which are substantially vertical. The exhaust pipe 21a' and an exhaust silencer 21s are aligned with the axis C' and in the general direction of the exhaust gas stream indicated by arrow G' out of an exhaust pipe 21a'. The SCR 21' is longitudinally aligned with axis N. The axis N is arranged at an angle to the exhaust pipe 21a' and the exhaust silencer 21s, which are aligned to have the gas flow passing therethrough substantially aligned with an axis C', the axis C' being substantially perpendicular to the ground. An exhaust connecting pipe 21c fluidly connects the SCR 21' with the silencer 21s. The rest of the exhaust gas treatment system 10' functions similarly to the exhaust gas treatment system 10.

Importantly, in the embodiment of FIG. 10, the SCR 21' is inclined relative to the coolant pipes 41, 44, 51 and 54, which are positioned vertically relative to the ground as in the previous embodiment. For this embodiment, it is only the orientation of the SCR 21' which is changed relative to the rest of the cooling system 30.

In yet a further embodiment, as is best seen in FIG. 9, feed pipe section 43' extends horizontally before extending vertically to meet with diameter expansion 44. Furthermore, return pipe section 53' extends vertically downwards/depends from the port 13b and sub section 53" before extending vertically to meet with diameter expansion 54. This arrangement may be used on either the feed port 13a or the return port 13b. As such, in alternative embodiments, pipes connected to the ports 13a and 13b may depend from the ports before turning to extend vertically relative to the ground and substantially parallel to the axis C.

As such, it will be appreciated that the portion of tube and/or pipe that exits either of port 13a and/or 13b may extend in any direction relative to the ports 13a and/or 13b, before turning to extend substantially vertically relative to the ground. The pipe routings from the ports 13a and 13b may be symmetrical or different depending on the requirements of the construction.

It will be understood that the second feed and return pipe section 42, 52 are in fluid communication with the third feed and return pipe section 43, 53 either directly or via the diameter expansions 44, 54. Indeed in some embodiments, the second feed and return pipe section 42, 52 may be in direct communication with the ports 13a and 13b respectively. The diameter expansions 44, 54 may simply be formed as localized expansions of a continuous pipe.

Furthermore, in alternative embodiments, the bypass line 60 may be positioned elsewhere so that the feed and return lines are in fluid communication. This could be between the second feed and return pipe sections 42, 52 of for example the third feed and return pipe sections 43, 53 or indeed between the diameter expansions 44, 54.

It is to be understood that the terms portion and section are generally interchangeable and refer to a part of a pipe tube or conduit.

In the foregoing, the applicants have described a cooling system for a tractor exhaust after treatment. The cooling system comprises a urea supply module have a first port and a second port; and an exhaust system, wherein the exhaust system comprises an exhaust pipe, and a catalytic converter. An engine cooling system comprises a heat exchanger, a fan, a coolant pump, a coolant feed line, and a coolant return line. The coolant feed line comprises a first portion and a section portion, and the coolant return line comprises a primary portion and a secondary portion and wherein each of the first portion, the second portion, the primary portion and the secondary portion are oriented generally vertically. The second portion is in fluid communication with the first port, the secondary portion is in fluid communication with the second port, and a bypass line provides fluid communication between the second and secondary portions The disclosure is not limited to the embodiments or examples described herein, and may be modified or adapted without departing from the scope of the present disclosure.

The invention claimed is:

1. A cooling system for a tractor exhaust after treatment, the cooling system comprising:
an exhaust system comprising an exhaust pipe and a catalytic converter;
a urea dosing module configured to inject urea into the catalytic converter, the urea dosing module having a first port and a second port;
an engine cooling system comprising:
a heat exchanger;
a fan;
a coolant pump;
a coolant feed line connecting the heat exchanger to the first port, the coolant feed line comprising first and second vertical feed pipe sections connected by a U-shaped section, wherein ends of the U-shaped section of the coolant feed line are directed downward, and wherein the second vertical feed pipe section is connected to the first port; and
a coolant return line connecting the second port to the heat exchanger, the coolant return line comprising first and second vertical return pipe sections connected by a U-shaped section, wherein ends of the U-shaped section of the coolant return line are directed downward, and wherein the first vertical return pipe section is connected to the second port;
wherein each of the first and second vertical feed pipe sections and the first and second vertical return pipe sections are oriented longitudinally parallel to an axis C substantially vertical relative to ground; and
a bypass line connecting the U-shaped section of the coolant feed line to the U-shaped section of coolant return line;
wherein at least one pipe section selected from the group consisting of the second vertical feed pipe section and the first vertical return pipe section extends upward from the urea dosing module.

2. The cooling system of claim 1, wherein the second vertical feed pipe section has a cross-sectional area greater than a cross-sectional area of the first vertical feed pipe section.

3. The cooling system of claim 1, wherein the first vertical return pipe section has a cross-sectional area greater than a cross-sectional area of the second vertical return pipe section.

4. The cooling system of claim 1, wherein the first port and the second port are at a same level relative to the ground.

5. The cooling system of claim 1, wherein one of the first port and the second port is positioned at a higher level relative to the ground than the other of the first port and the second port.

6. A tractor comprising the cooling system of claim 1.

7. The cooling system of claim 1, wherein the second vertical feed pipe section extends upward from the first port and the first vertical return pipe section extends downward from the second port.

8. The cooling system of claim 1, wherein the bypass line is positioned above the first port and the second port.

* * * * *